United States Patent
Konishi et al.

(10) Patent No.: US 6,865,471 B2
(45) Date of Patent: Mar. 8, 2005

(54) METHOD AND APPARATUS FOR CONTROLLING VEHICLE CRUISE

(75) Inventors: Yasufumi Konishi, Tokyo (JP); Taisetsu Tanimichi, Tokyo (JP); Tatsuya Yoshida, Tokyo (JP); Toshio Manaka, Tokyo (JP); Hidefumi Adachi, Tokyo (JP); Eiichiro Kondo, Ibaraki (JP)

(73) Assignees: Hitachi, Ltd., Tokyo (JP); Hitachi Car Engineering Co., Ltd., Hitachinaka (JP)

(*) Notice: Subject to any disclaimer, the term of this patent is extended or adjusted under 35 U.S.C. 154(b) by 0 days.

(21) Appl. No.: 10/410,187

(22) Filed: Apr. 10, 2003

(65) Prior Publication Data

US 2003/0195691 A1 Oct. 16, 2003

(30) Foreign Application Priority Data

Apr. 11, 2002 (JP) .......................... 2002-108684

(51) Int. Cl.$^7$ ............................................. G06F 19/00
(52) U.S. Cl. ........................ 701/93; 180/170; 180/177; 340/904; 303/125
(58) Field of Search ........................... 701/70, 98, 104, 701/96, 93, 95, 97; 180/177, 170, 179, 167, 178; 303/125, 132; 477/108; 340/904

(56) References Cited

U.S. PATENT DOCUMENTS

| | | | |
|---|---|---|---|
| 4,046,213 A | * | 9/1977 | Larson ....................... 180/177 |
| 4,598,370 A | | 7/1986 | Nakajima et al. |
| 4,835,696 A | | 5/1989 | Suzuki et al. |
| 4,870,583 A | * | 9/1989 | Takahashi et al. ............ 701/93 |
| 4,939,657 A | | 7/1990 | Imai et al. |
| 5,329,454 A | * | 7/1994 | Takada et al. ................ 701/95 |
| 5,592,385 A | * | 1/1997 | Katayama et al. ............ 701/93 |
| 5,710,565 A | * | 1/1998 | Shirai et al. .................. 342/70 |

FOREIGN PATENT DOCUMENTS

| | | |
|---|---|---|
| JP | 9-86224 | 3/1997 |
| JP | 2000-108716 | 4/2000 |

* cited by examiner

*Primary Examiner*—Thomas G. Black
*Assistant Examiner*—Ronnie Mancho
(74) *Attorney, Agent, or Firm*—Crowell & Moring LLP

(57) ABSTRACT

A vehicle cruise control apparatus is provided for controlling a vehicle to run at a set speed desired by a driver. The apparatus stores a state in which the driver inputs a set speed (for example, the number of times the driver inputs the set speeds and a period at which the driver inputs the set speeds), and calculates a target acceleration/deceleration from the input state and a vehicle speed deviation (calculated by subtracting the actual vehicle speed from the set speed).

3 Claims, 15 Drawing Sheets

TARGET ACCELERATION/DECELERATION MAP (IN m/s$^2$)
(CALCULATED THROUGH INTERPOLATION OF TWO-DIMENSIONAL MAP SHOWN BELOW)

| | | | VEHICLE SPEED DEVIATION Vd2 (SET SPEED Vs2 MINUS ACTUAL VEHICLE SPEED Vn) [m/s] | | | | |
|---|---|---|---|---|---|---|---|
| | | | −4 | −2 | 0 | 2 | 4 |
| DRIVER SET SPEED INPUT STATE VARIABLE Ss | SLOW ← FAST | DECELERATION INSTRUCTION | −50 | −0.7 | −0.5 | 0 | 0.02 | 0.1 |
| | | | −25 | −0.5 | −0.3 | 0 | 0.05 | 0.2 |
| | | | 0 | −0.3 | −0.15 | 0 | 0.15 | 0.3 |
| | FAST → SLOW | ACCELERATION INSTRUCTION | 25 | −0.2 | −0.05 | 0 | 0.3 | 0.5 |
| | | | 50 | −0.1 | −0.02 | 0 | 0.5 | 0.7 |
| | SWITCH INPUT OPERATION | ACCELERATION/ DECELERATION DIRECTION | | | | | | |

FILTERING CONSTANT MAP (IN SECONDS)
(CALCULATED THROUGH INTERPOLATION OF TWO-DIMENSIONAL MAP SHOWN BELOW)

| | | ABSOLUTE VALUE $|Vd|$ OF VEHICLE SPEED DEVIATION (SET SPEED Vs MINUS ACTUAL VEHICLE SPEED Vn) | | | | |
|---|---|---|---|---|---|---|
| | | 0 | 1 | 2 | 3 | 4 |
| ABSOLUTE VALUE $|Ss|$ OF DRIVER SET SPEED INPUT STATE VARIABLE Ss | 0 | 7.00 | 7.00 | 7.00 | 7.00 | 7.00 |
| | 10 | 7.00 | 6.50 | 6.00 | 5.50 | 5.00 |
| | 20 | 7.00 | 6.00 | 5.00 | 3.50 | 3.00 |
| | 30 | 7.00 | 5.50 | 3.50 | 3.00 | 2.50 |
| | 40 | 7.00 | 5.00 | 3.00 | 2.50 | 2.00 |

FIG.15 the present invention will be described in connection with an embodiment with reference to FIGS. 1 to 15.

METHOD AND APPARATUS FOR CONTROLLING VEHICLE CRUISE

BACKGROUND OF THE INVENTION

The present invention relates to a method and an apparatus for controlling a vehicle cruise, and more particularly to a method and apparatus for controlling an actual vehicle speed, which is a running speed of a vehicle, to a set speed desired by a driver to hold the vehicle at the fixed vehicle speed.

A known vehicle cruise control apparatus of the type mentioned above involves calculating a target acceleration or deceleration from a deviation of an actual vehicle speed from a set speed instructed by a driver, and controlling a throttle valve based on the target acceleration or deceleration to accomplish vehicle cruise. Another known vehicle cruise control apparatus involves calculating a look-ahead vehicle speed, which anticipates an actual vehicle speed, based on the actual vehicle speed and an actual acceleration, calculating a target acceleration or deceleration based on a deviation of the look-ahead vehicle speed from a set speed instructed by a driver and a look-ahead acceleration, and controlling a throttle actuator based on the target acceleration or deceleration to accomplish vehicle cruise.

JP-A-9-86224 and JP-A-2000-108716 disclose prior art techniques related to vehicle cruise control apparatuses of the type mentioned above.

However, since the prior art control apparatuses mentioned above calculate the target acceleration or deceleration from the vehicle speed deviation (deviation of the actual vehicle speed from the set speed) for controlling the vehicle to run at a constant speed, the driver's will cannot be always reflected to the control. Assume, for example, that the driver inputs a set speed, which can cause overshooting, in order to eventually increase a vehicle speed from Vn0 to Vng, as shown in FIG. 8.

Figure 8:
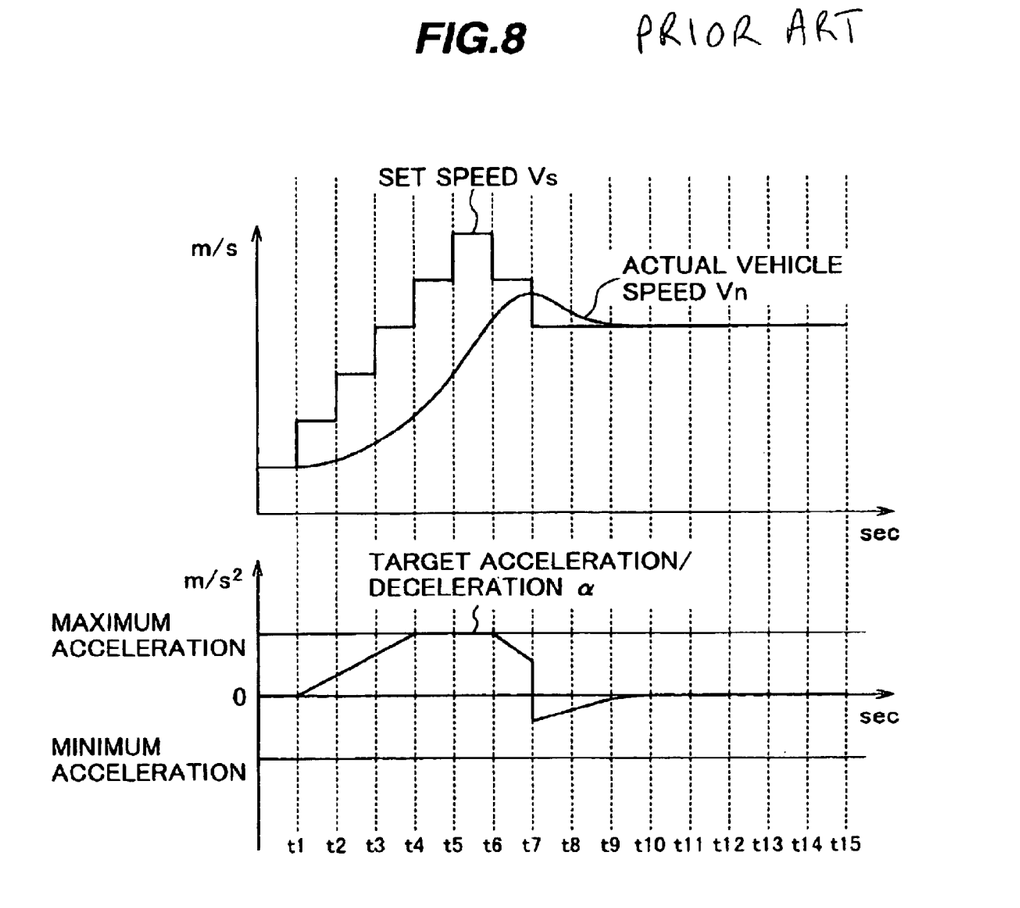
FIG. 8 is a timing chart showing a set speed, an actual vehicle speed and a target acceleration/deceleration during a vehicle cruise control according to a prior art technique.

In this event, as the vehicle speed deviation of the actual vehicle speed from the set speed gradually increases from timing t1 in FIG. 8, causing a target acceleration to correspondingly increase to a maximum acceleration at timing t4 in FIG. 8, in which case, however, the acceleration from timing t1 to timing t4 in FIG. 8 is felt rather slow, causing the driver to feel awkward. In addition, the acceleration is gradually reduced between timings t6 and t7 in FIG. 8, in which the vehicle speed deviation begins to decrease, after the vehicle has accelerated to the maximum acceleration (between timings t4 and t6 in FIG. 8), whereas the vehicle speed deviation still has a positive value, and a relatively large acceleration is maintained until timing t7 in FIG. 8 at which the set speed intersects the actual vehicle speed, i.e., at which the vehicle speed deviation decreases to zero (Vs−Vn=0 km/h), so that a subsequent deceleration is delayed (t7–t10). Consequently, the actual vehicle speed is delayed with respect to the set speed, causing the vehicle to feel awkward.

SUMMARY OF THE INVENTION

The present invention has been made in view of the circumstance mentioned above, and it is an object of the invention to provide a vehicle cruise control apparatus which is capable of reflecting a set speed inputted by a driver to a target acceleration or deceleration to accomplish a behavior of a vehicle which follows the driver's will.

To achieve the above object, the present invention provides a vehicle cruise control apparatus which includes an actuator mounted in a vehicle for adjusting a running speed of the vehicle, an operating switch for setting a vehicle speed desired by a driver, driver set speed input state storage means for storing an input state when the driver operates the operating switch, actual vehicle speed detecting means for detecting the actual vehicle speed which is a running speed of the vehicle, means for calculating a vehicle speed deviation of the actual vehicle speed (or a look-ahead vehicle speed) from the set speed set by the driver, means for calculating a target acceleration/deceleration from the driver set speed input state and the vehicle speed deviation, and means for controlling the actuator to satisfy the target acceleration/deceleration.

DETAILED DESCRIPTION OF THE EMBODIMENTS

In the following, the present invention will be described in connection with an embodiment with reference to FIGS. 1 to 15.

Figure 1:
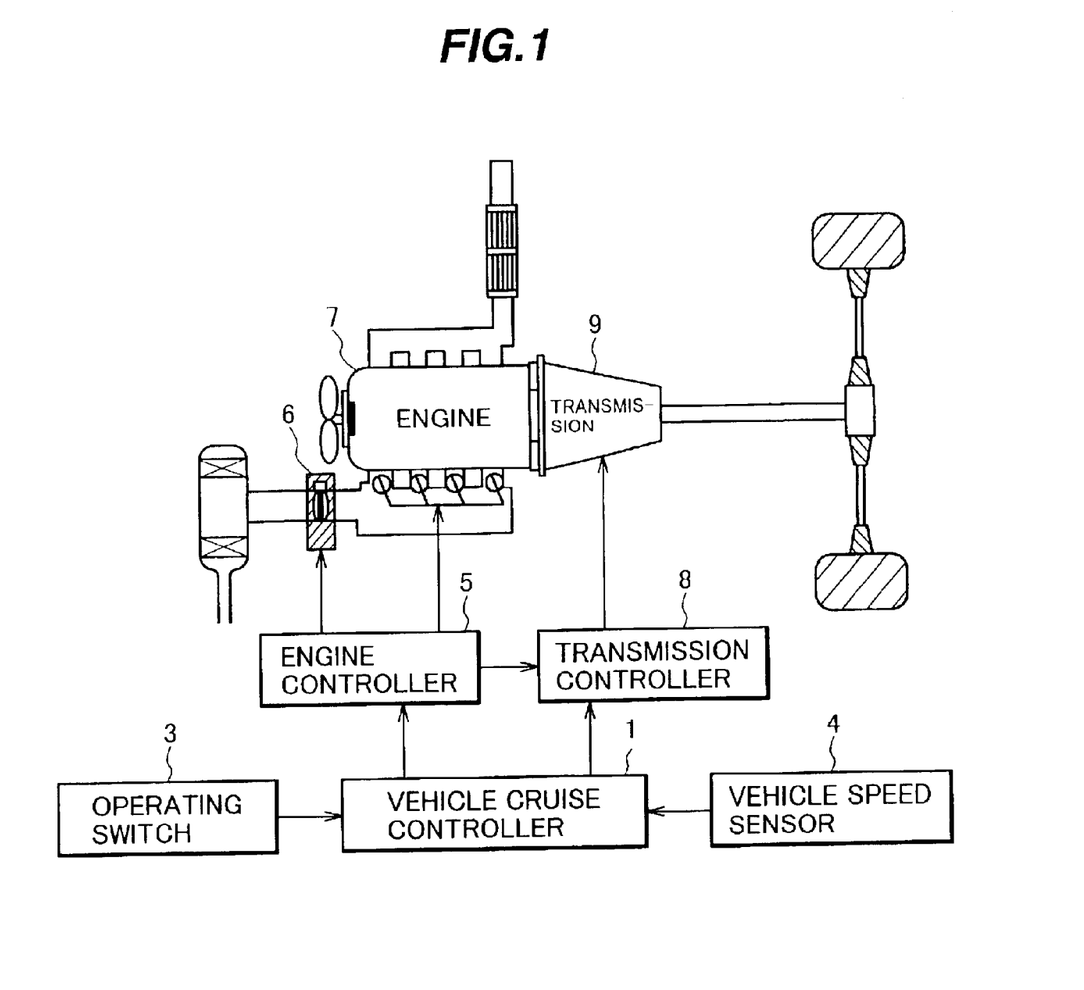
FIG. 1 is a block diagram generally illustrating the configuration of a vehicle cruise control apparatus according to one embodiment of the present invention.

FIG. 1 is a block diagram generally illustrating the configuration of a vehicle cruise control apparatus according to one embodiment of the present invention. A vehicle cruise controller 1 receives information from a vehicle speed sensor 4, and receives information on a set speed desired by a driver from an operating switch 3, calculates a target acceleration/deceleration to match an actual vehicle speed with the set speed, and outputs the target acceleration/deceleration to an engine controller 5. The engine controller 5 drives an engine 7 and a throttle actuator 6 based on the target acceleration/deceleration received from the vehicle cruise controller 1 to control the opening of a throttle valve, thereby increasing or decreasing the power of the engine 7.

When a transmission 9 must be controlled, the vehicle cruise controller 1 or engine controller 5 outputs an instruction to a transmission controller 8 to conduct a control for the transmission 9.

Figure 2:
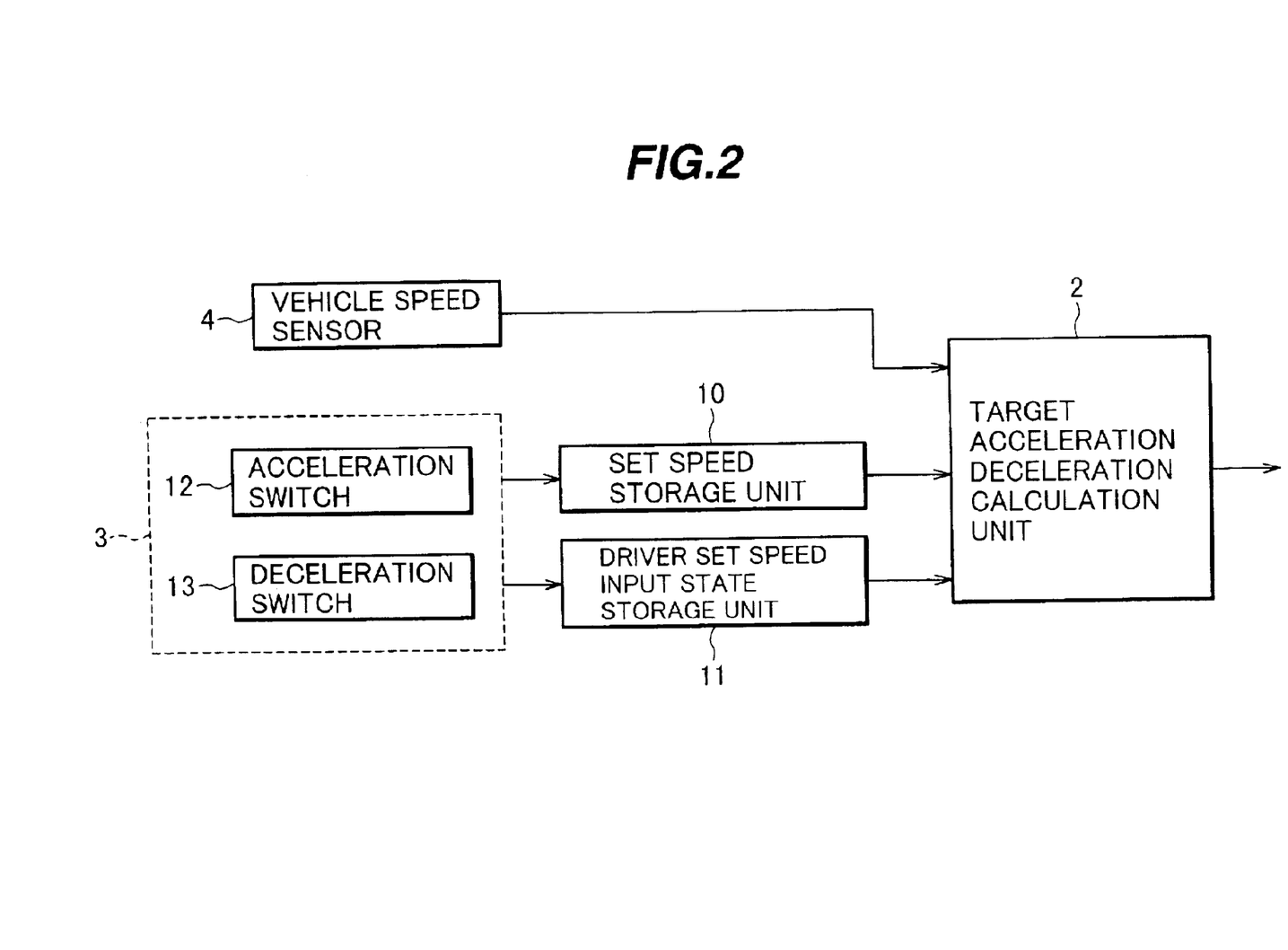
FIG. 2 is a block diagram generally illustrating a vehicle cruise controller in FIG. 1.

Next, a process performed in the vehicle cruise controller 1 to derive the target acceleration/deceleration will be described with reference to FIGS. 2 and 3. Referring first to FIG. 2, the operating switch 3 comprises an acceleration switch 12 and a deceleration switch 13 for the driver to input a desired set speed Vs. The set speed Vs is often in a range of 40 to 120 km/h, for example, in Japan. At present, since the low speed running control cannot support open roads, the set speed is typically between a lower limit which is approximately 40 km/h and an upper limit which is approximately 110–120 km/h in consideration of high ways, hill climbing, or the like.

When the driver operates the acceleration switch 12 in the operating switch 3, the set speed Vs is increased by a set speed width (in this example, 5 km/h) such as 80, 85, 90, 95, ..., km/h, by way of example. When the driver operates the deceleration switch 13, the set speed Vs is reduced by a certain speed width (which may be equal to or different from the increased width). The resulting vehicle speed Vs is stored in a set speed storage unit 10. In this embodiment, the set speed Vs is increased or decreased by a fixed speed width, however, the speed width may be variable. For example, the vehicle cruise control can follow the driver's will when the speed width is corresponded to a switch input frequency variable Sf, later described. Specifically, when the driver keeps pushing the acceleration switch 12 or deceleration switch 13 down, the set speed Vs may be increased or decreased in steps of 1 km/h for the first two seconds, and subsequently in steps of 5 km/h.

Figure 11:
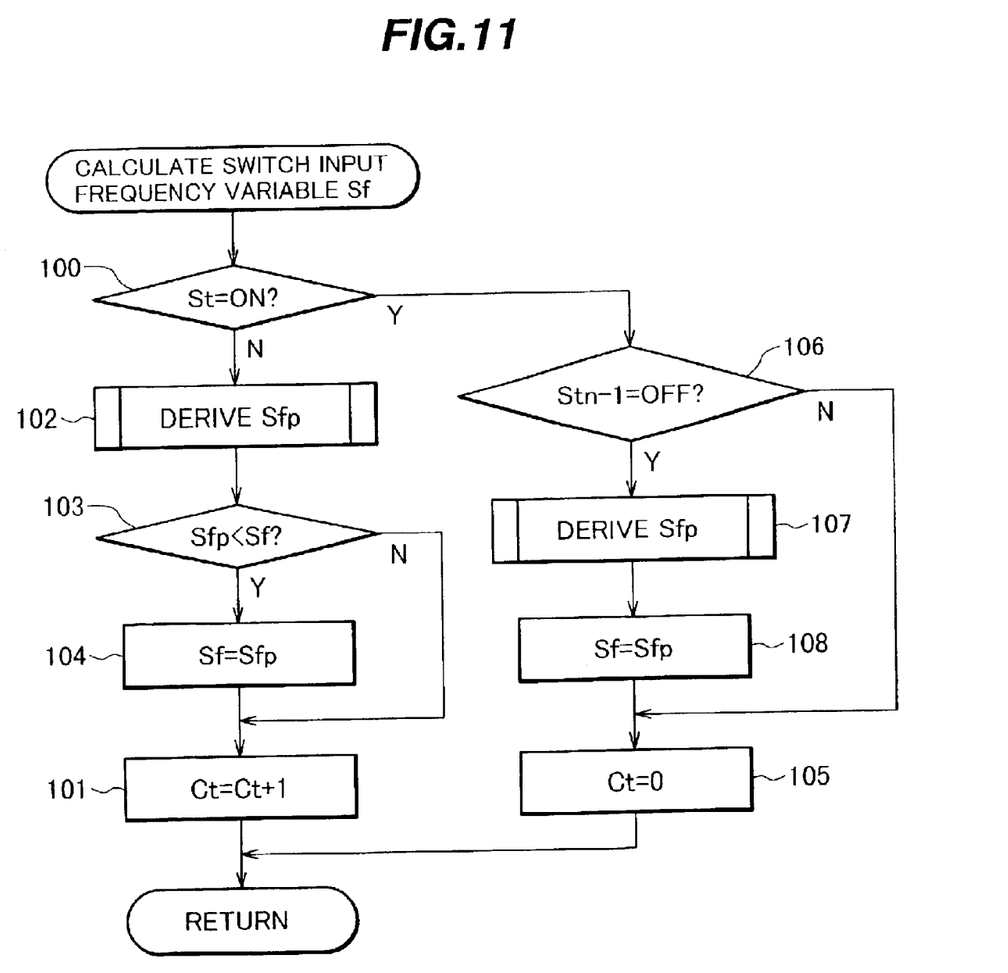
FIG. 11 is a flow chart illustrating a procedure for processing a switch input frequency variable Sf in the first embodiment.
Figure 12:
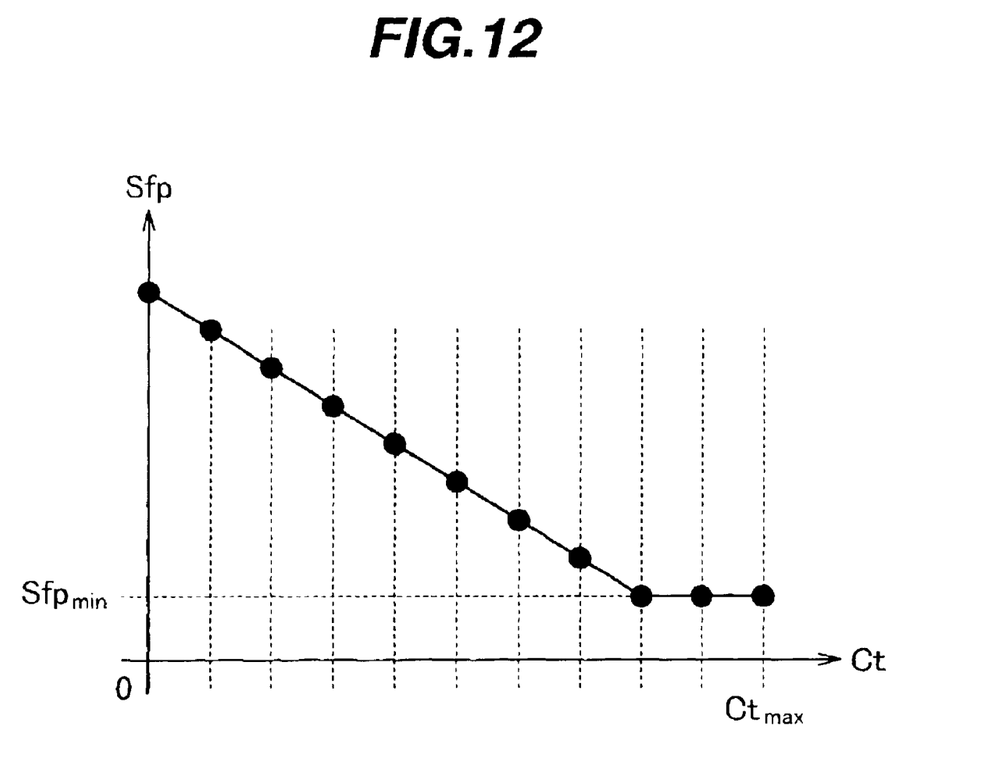
FIG. 12 is a graph showing a characteristic of a switch input frequency Sfp in the first embodiment.

Next, driver set speed input state storage unit 11 stores an input state of the operating switch 3, indicative of the frequency at which the driver pushes the operating switch 3, and whether the driver pushes the acceleration switch 12 or deceleration switch 13. Also, as shown in FIG. 3, the vehicle cruise controller 1 takes a logical OR of an acceleration switch input signal Sat and a deceleration switch input signal Sdt to generate a switch input variable St(SatUSdt), and generates a switch input frequency variable Sf based on the duration of the switch input variable St from a falling (OFF) edge to a rising (ON) edge. A procedure for processing the switch input frequency variable Sf will be described in detail with reference to FIGS. 11 to 13. A flow chart in FIG. 11 illustrating the processing on the switch input frequency variable Sf is repeated every control period. In FIG. 11, it is first determined whether or not the switch input variable St is ON (step 100). When the switch input variable St is ON, it is next determined whether or not the preceding value (St one period before) Stn-1 of the switch input variable is OFF (step 106). When the preceding value Stn-1 of the switch input variable is OFF, it can be determined that a transition from OFF to ON of the switch input variable ST is detected as is done at timing t1 in FIG. 13. Thus, the switch input frequency Sfp is derived based on a OFF-to-ON duration variable Ct. FIG. 12 shows an exemplary characteristic of the switch input frequency Sfp which is an output to the OFF-to-ON duration variable Ct at step 107 in FIG. 11.

Next, in FIG. 11, the switch input frequency Sfp is substituted into the switch input frequency variable Sf (step 108), and the OFF-to-ON duration variable Ct is cleared for measuring again the duration between the falling edge (OFF) and the next rising edge (ON).

Figure 13:
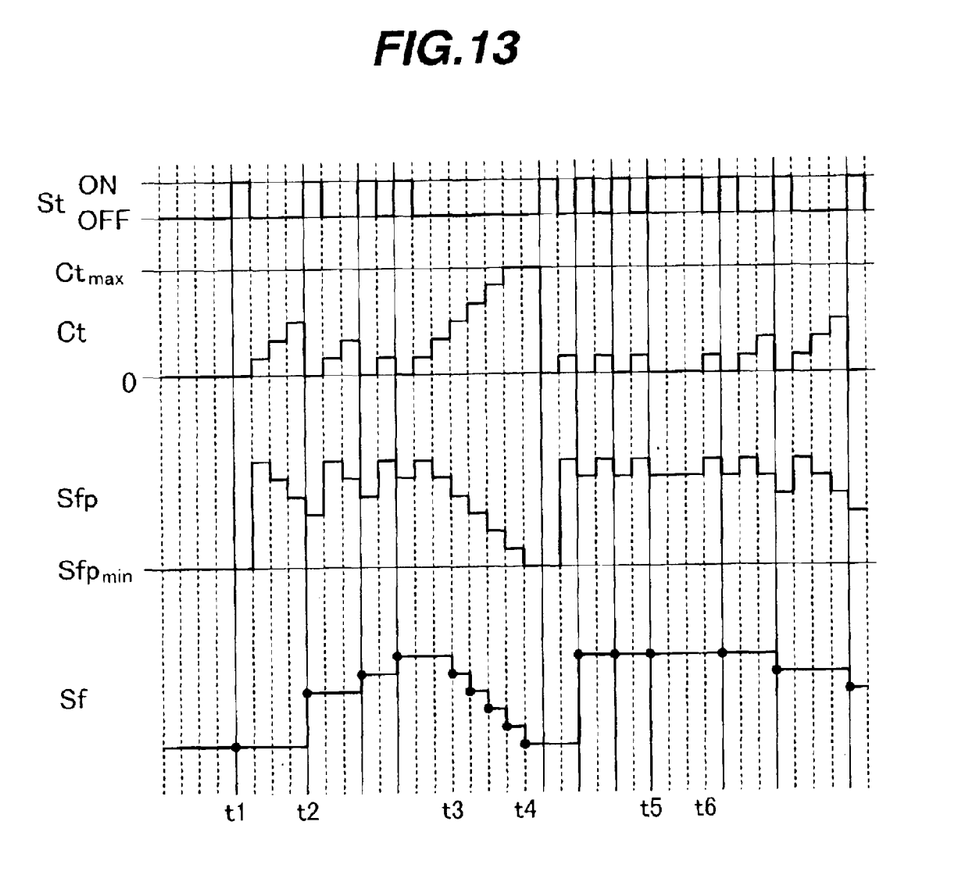
FIG. 13 is a timing chart used to calculate the switch input frequency variable Sf in the first embodiment.

When the preceding value Stn-1 of the switch input variable is ON at step 106 in FIG. 11, it is determined that the switch input is kept ON as can be seen between timings t5 and t6 in FIG. 13, and the OFF-to-ON duration variable Ct is cleared (step 105), without updating the switch input frequency variable Sf.

At step 100 in FIG. 11, when the switch input variable St is OFF, the switch input frequency Sfp is derived in a manner similar to that at step 107 (step 102). It is next determined whether or not the switch input frequency Sfp is smaller than the switch input frequency variable Sf (step 103). When the switch input frequency Sfp is smaller than the switch input frequency variable Sf, it is determined that the switch input frequency variable Sf has a value larger than the actual switch input frequency Sfp, caused by the operating switch 3 which has not been operated, as can be seen between timings t3 and t4 in FIG. 13. Then, the switch input frequency Sfp is substituted into the switch input frequency variable Sf. In addition, the OFF-to-ON duration variable Ct is incremented to continuously measure the time for which the switch remains OFF.

When the switch input frequency Sfp is equal to or higher than the switch input frequency variable Sf at step 103 in FIG. 11, this means that the switch has been left unoperated, as can be seen between timings t1 and t2 in FIG. 13, so that no value can be determined for the switch input frequency Sf until the next detection of a transition of the switch from the OFF state to the ON state. Therefore, in this event, the switch input frequency variable Sf is not updated.

Figure 3:
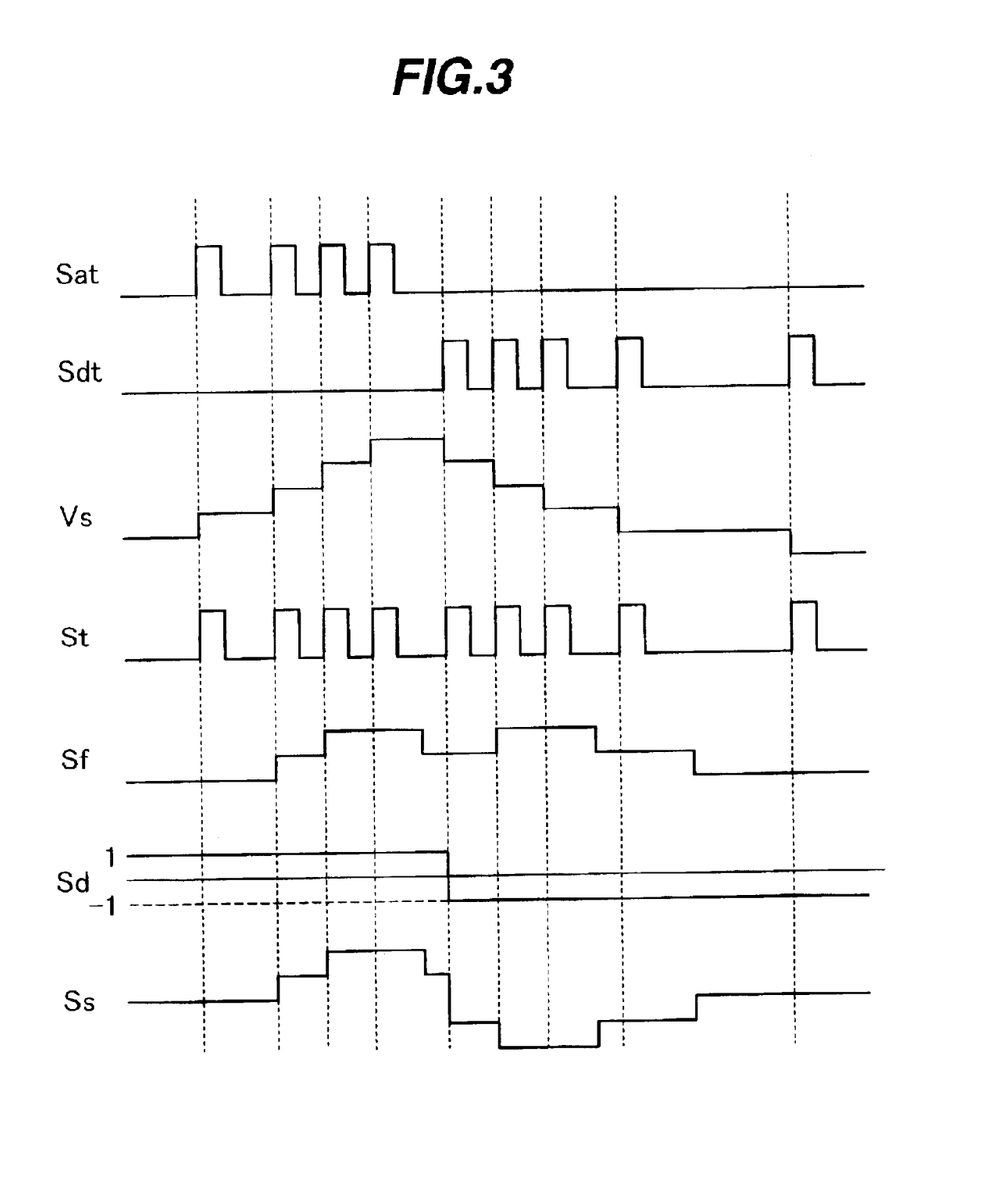
FIG. 3 is a timing chart used to calculate a driver set speed input state variable Ss.

Referring next to FIG. 3, description will be made on a method of generating a driver set speed input state variable Ss based on the switch input frequency variable Sf. First, the vehicle cruise controller 1 generates an acceleration/deceleration direction variable Sd based on an acceleration switch input signal Sat and a deceleration switch input signal Sdt. The acceleration/deceleration direction variable Sd takes "1" when acceleration is instructed and "−1" when deceleration is instructed. In addition, the vehicle cruise controller 1 generates a driver set speed input state variable Ss which is calculated by multiplying the aforementioned switch input frequency variable Sf by the acceleration/deceleration direction variable Sd.

Figure 4:
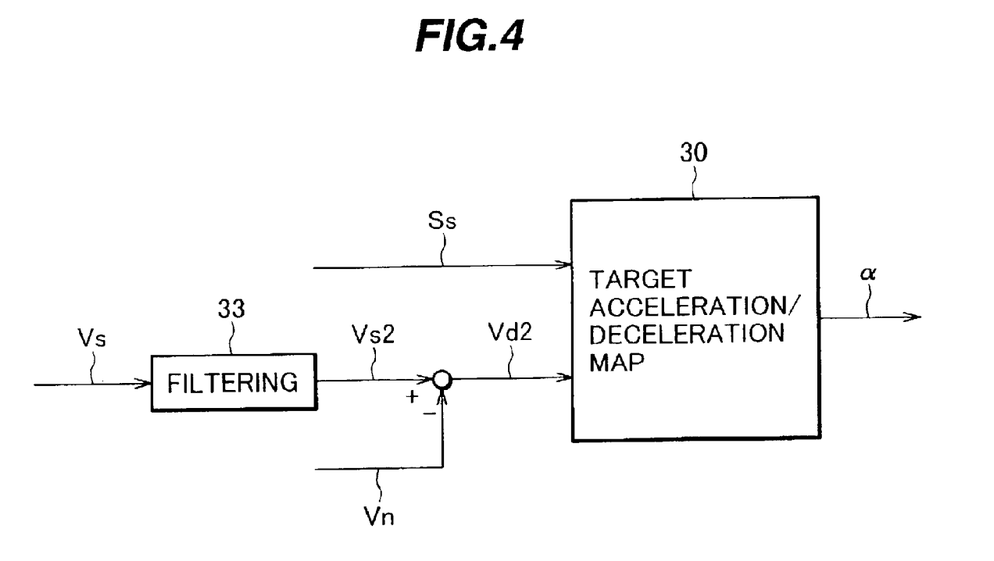
FIG. 4 is a block diagram illustrating a target acceleration/deceleration calculation unit in a first embodiment.

Next, a procedure for driving the target acceleration/deceleration will be described with reference to FIG. 4. A vehicle speed deviation Vd can be calculated by the following equation based on an actual vehicle speed Vn and the set speed Vs:

$$Vd=Vs-Vn$$

Figure 14:
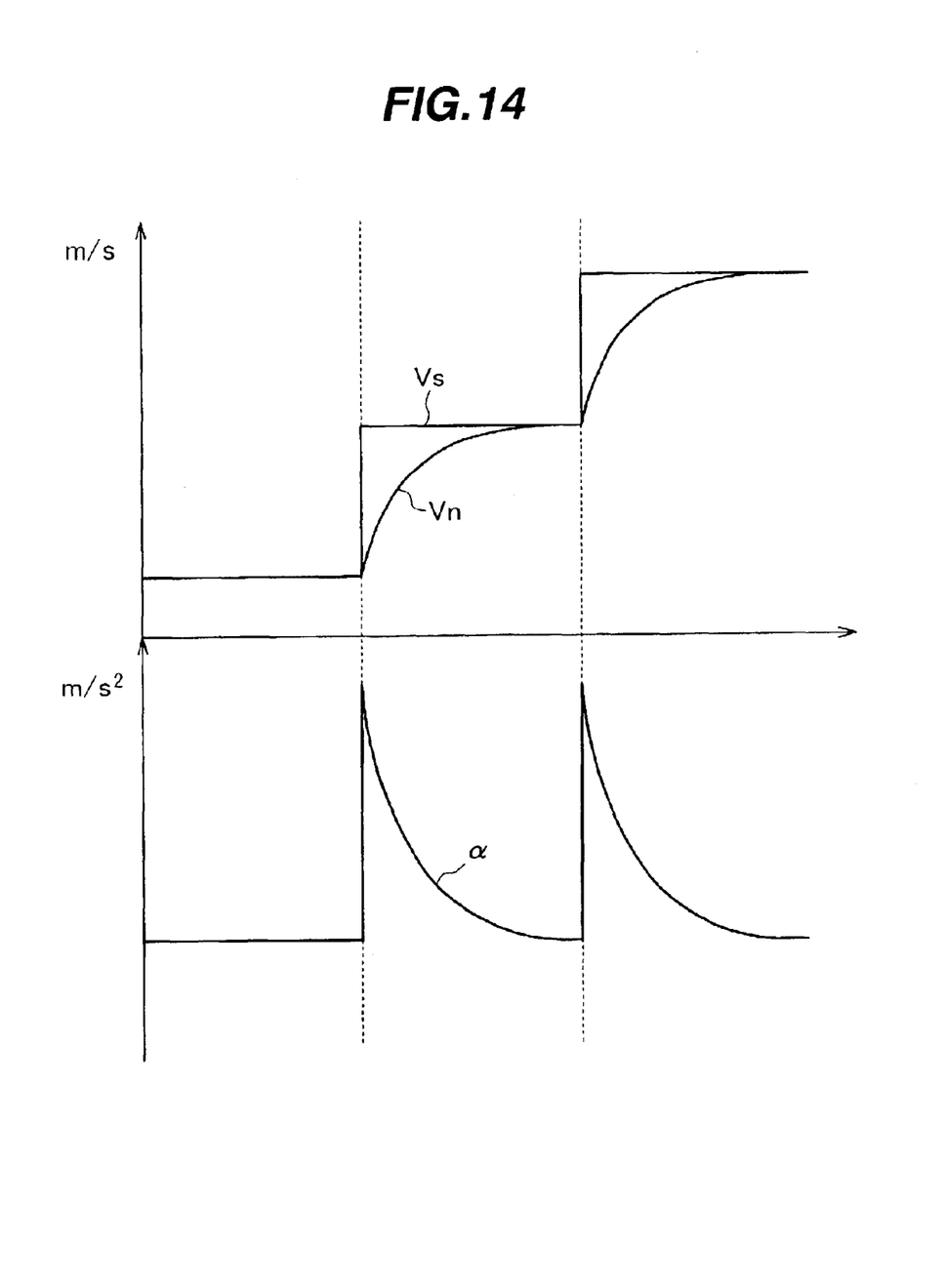
FIG. 14 is a timing chart used to calculate the target acceleration/deceleration based on the actual vehicle speed Vn and set speed Vs.

When the target acceleration/deceleration is calculated based on the vehicle speed deviation Vd, the set speed Vs is changed in steps in this embodiment, so that a very large target acceleration/deceleration can be calculated only at the moment the set speed Vs is changed, as shown in FIG. 14, resulting in bad running feeling. To avoid this inconvenience, in this embodiment, the set speed Vs is filtered (in a block 33) to generate a second set speed Vs2 which continuously vary, as shown in FIG. 4. This second set speed Vs2 is employed for calculating the target acceleration/deceleration. In this embodiment, the second set speed Vs2 is calculated by the following equation using a second vehicle speed deviation Vd1 and a second set speed Vs2_z1 in the preceding control period:

$$Vs2 = Vs2\_z1 + Vd1$$

Assume herein that the second set speed Vs2 is initialized to Vs (Vs2=Vs) upon start of the vehicle cruise control.

This processing advantageously increases the resolution of the set speed, thereby permitting the set speed to smoothly vary. However, the second set speed Vs2 which excessively promptly follows Vs would make Vs2_z1 equal to Vs2, whereas the second set speed Vs2 which sluggishly follows Vs, i.e., which presents a poor response would cause the driver to experience a stress. Thus, the set speed Vs is filtered to ensure a desired response characteristic.

Figure 10:
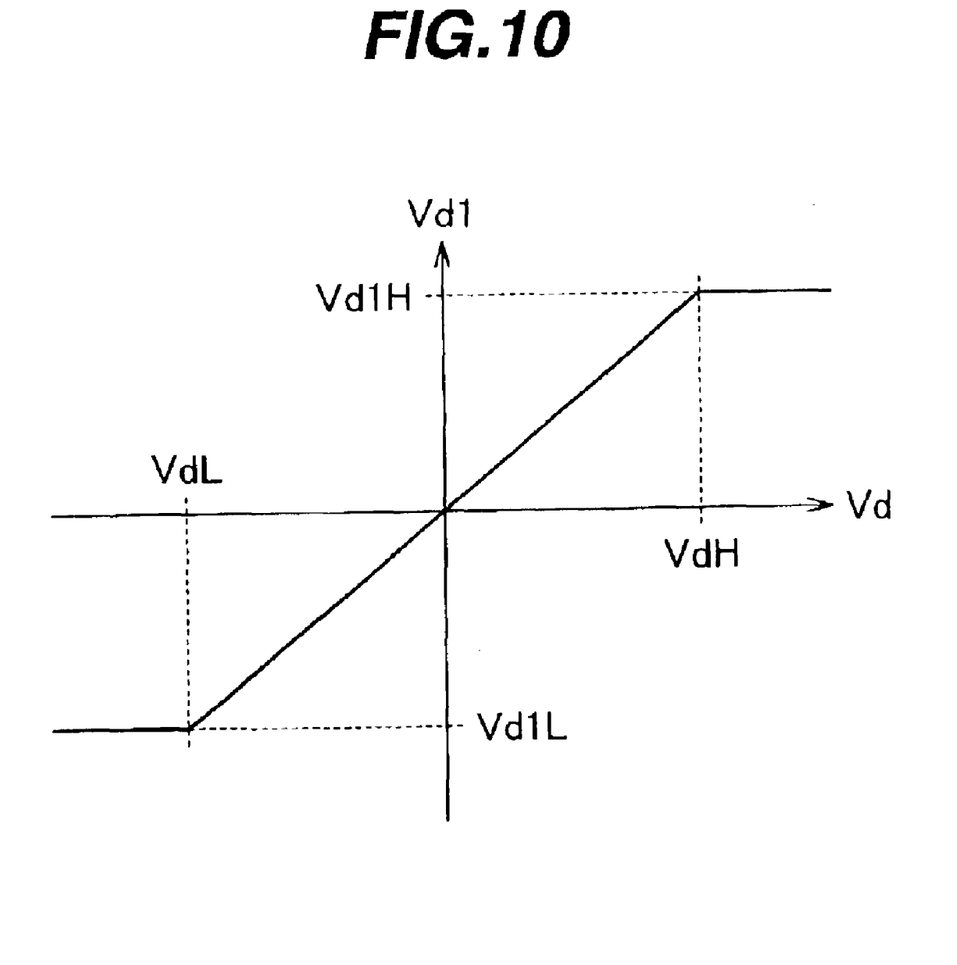
FIG. 10 is a graph showing a characteristic of a second vehicle speed deviation Vd1 in the first embodiment.
Figure 15:
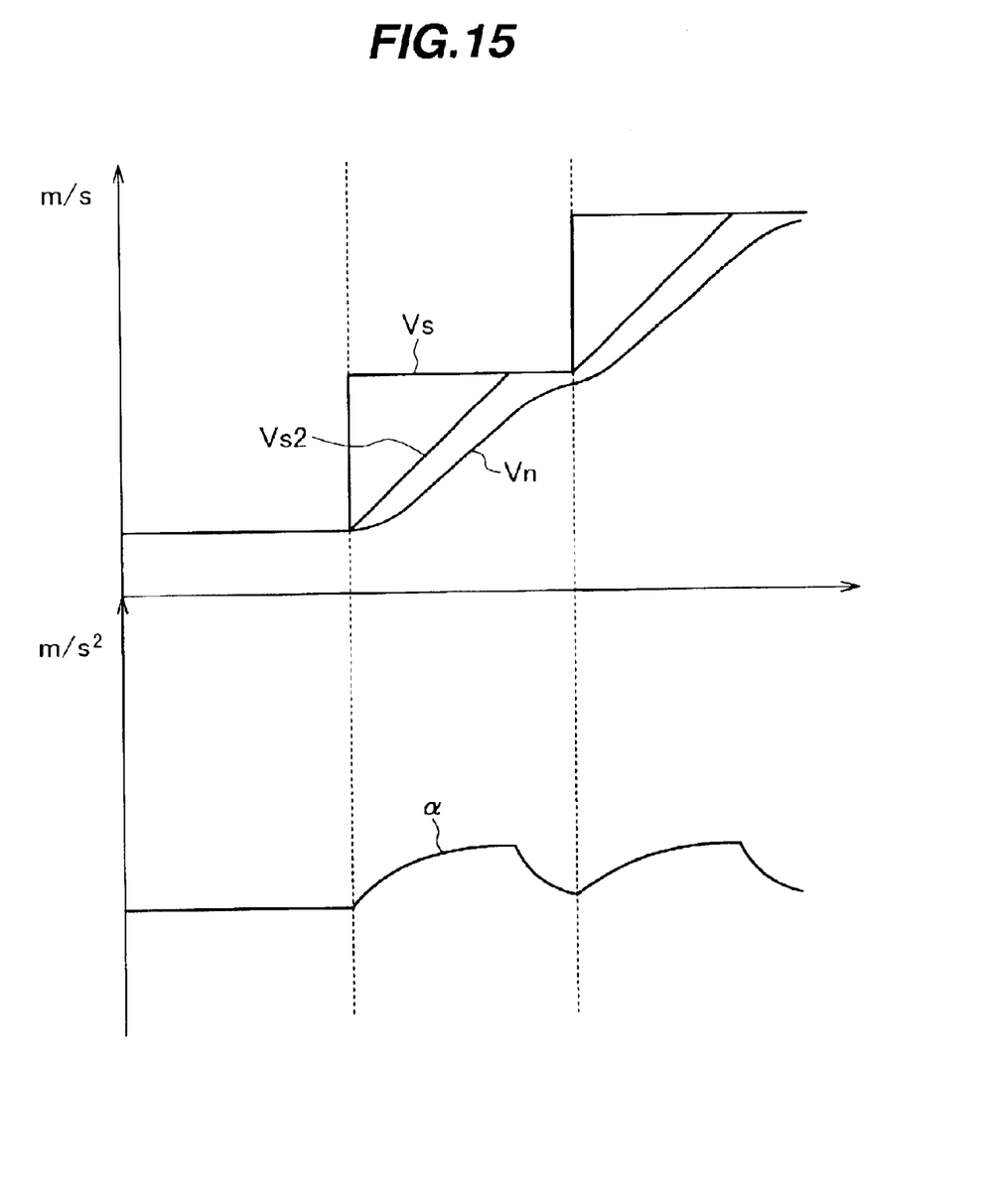
FIG. 15 is a timing chart used to calculate the target acceleration/deceleration based on the actual vehicle speed Vn and second set speed Vs2.

FIG. 10 shows an exemplary characteristic of the second vehicle speed deviation Vd1 which is an output corresponding to the vehicle speed deviation Vd in the filtering 33. The second vehicle speed deviation Vd1 is limited to Vd1H when the vehicle speed deviation Vd is equal to or higher than a predefined upper limit VdH, and is limited to a second vehicle speed deviation Vd1L when the vehicle speed deviation Vd is equal to or lower than a predefined lower limit value VdL, thereby preventing an excessively large target acceleration/deceleration from being calculated when the set speed Vs changes in steps as shown in FIG. 15. Further, the second vehicle speed deviation Vd2 is calculated from the following equation, and the target acceleration/deceleration is derived from the second vehicle speed deviation Vd2 and input state variable Ss using a target acceleration/deceleration map 30:

$$Vd2 = Vs2 - Vn$$

Figure 5:
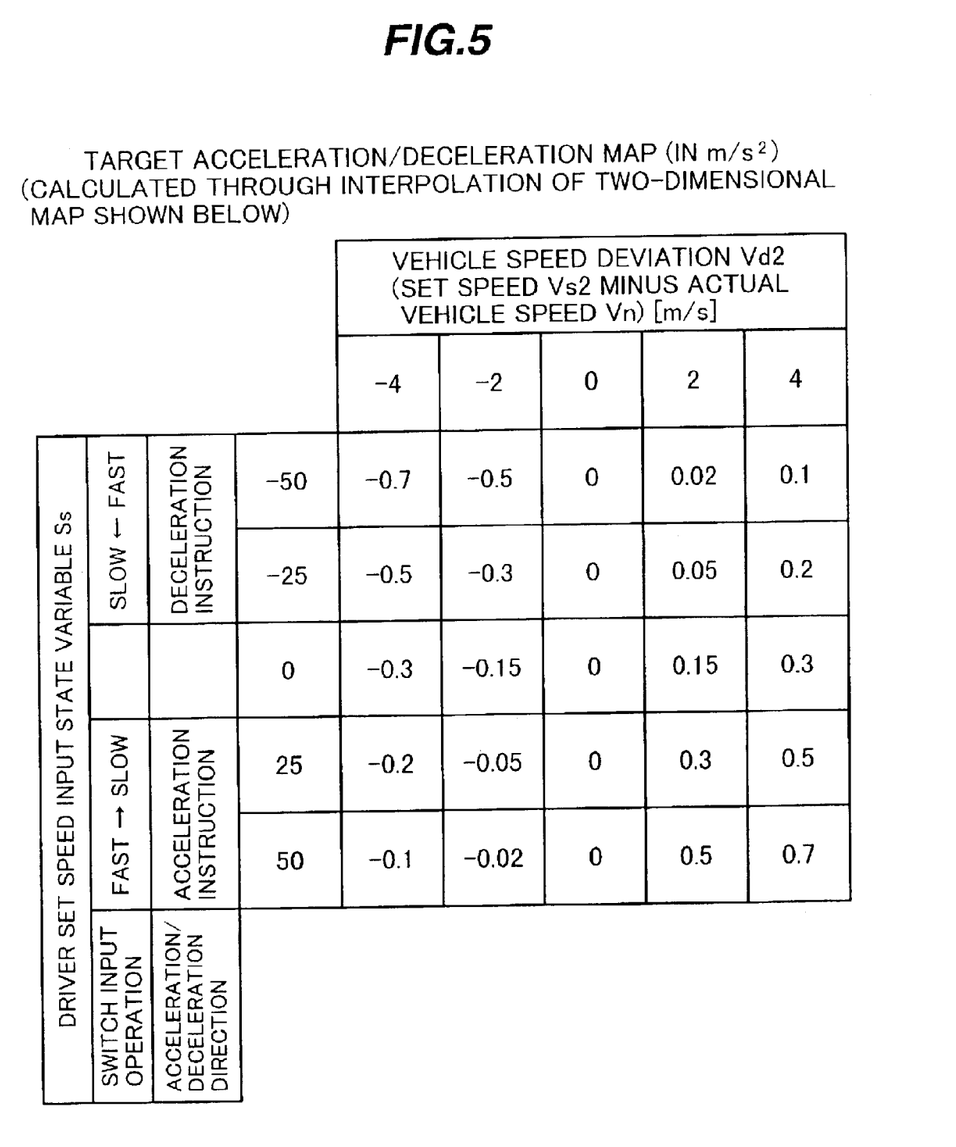
FIG. 5 shows a target acceleration/deceleration map used in the first embodiment.

Here, the target acceleration/deceleration map 30 is two-dimensional map data which takes the vehicle speed deviation Vd2 on the horizontal axis and the driver set speed input state variable Ss on the vertical axis, as shown in FIG. 5, wherein a particular target acceleration/deceleration is assigned to each grid point (coordinates (Vd2, Ss)). An intermediate value between two grid points is calculated through linear interpolation, whereas a value out of the map is limited to data of map end.

Next, a second embodiment of the running control apparatus will be described with reference to FIGS. 6 and 7. While the second embodiment is the same as the first embodiment in the general configuration, the second embodiment employs a different method for calculating the target acceleration/deceleration.

Figure 6:
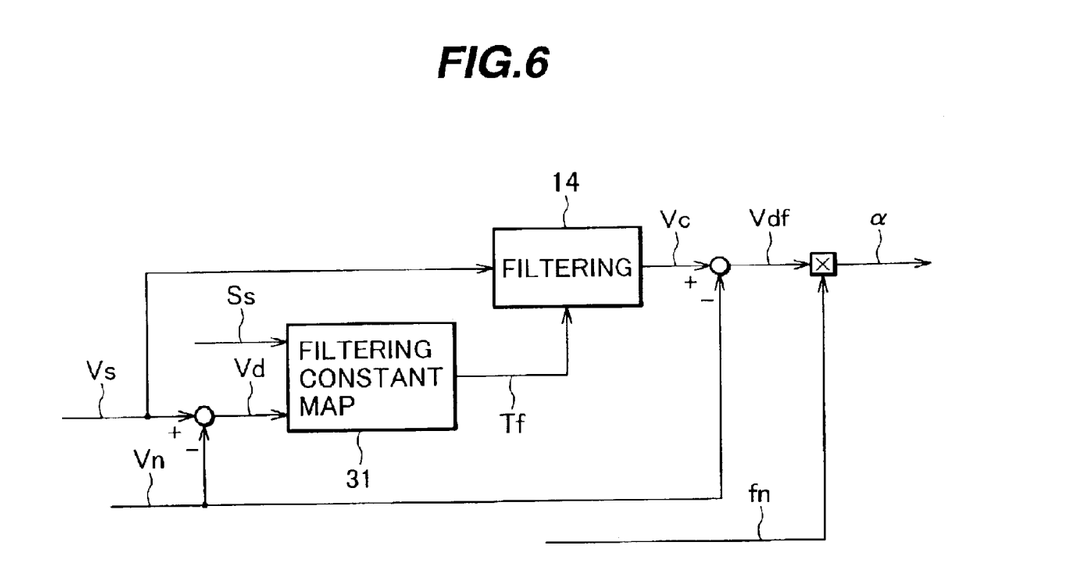
FIG. 6 is a block diagram illustrating a target acceleration/deceleration calculation unit in a second embodiment.
Figure 7:
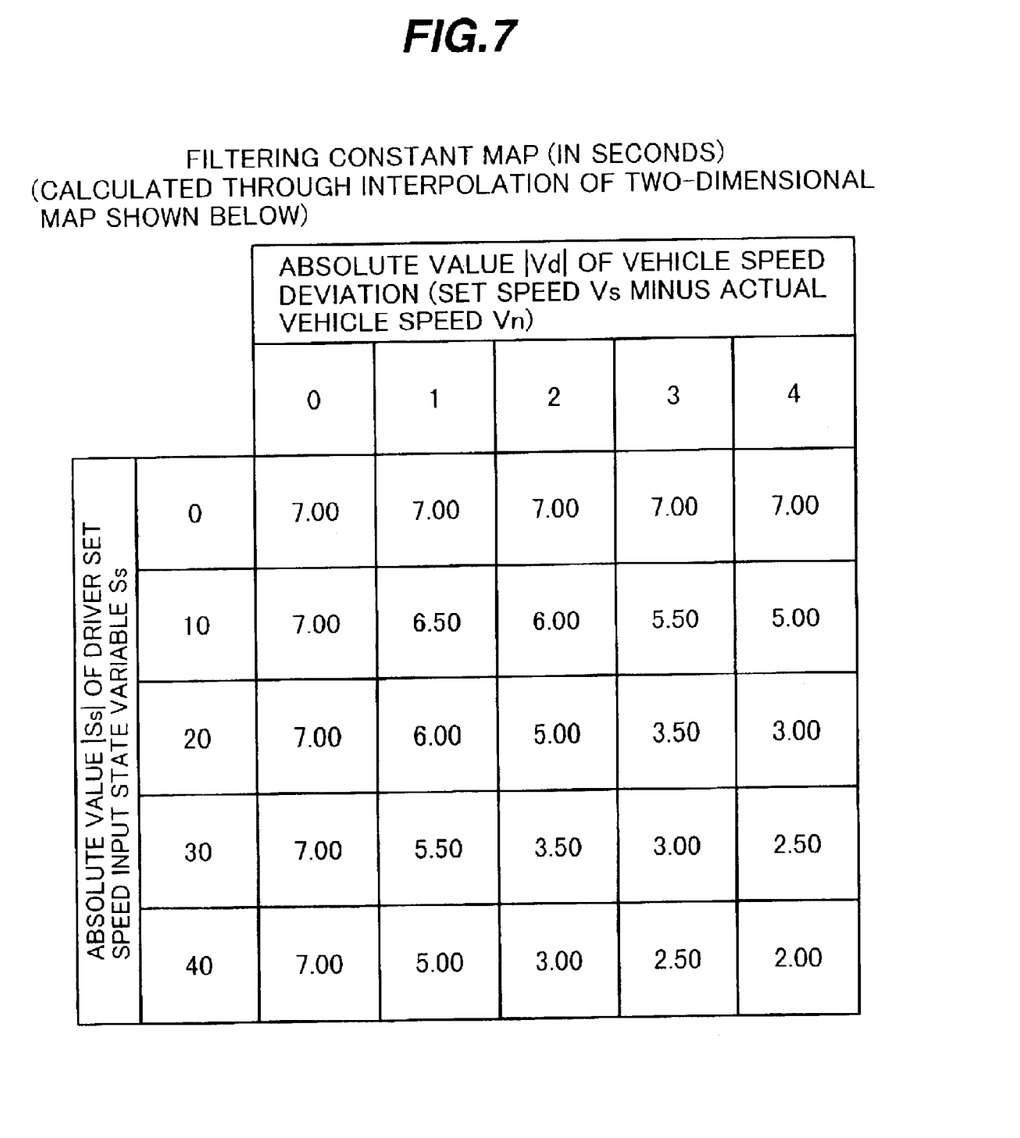
FIG. 7 shows a filtering constant map used in the second embodiment.

As shown in FIG. 6, the target acceleration/deceleration is calculated in the following manner. The set speed Vs is filtered in a filtering block 14 to derive a target vehicle speed Vc. A vehicle speed deviation Vdf of the actual vehicle speed Vn from the target vehicle speed Vc is calculated, and divided by a control period Tn to derive the target acceleration/deceleration:

$$Vdf = Vc - Vn$$
$$= Vdf \times fn \text{ (where } fn = 1/Tn\text{)}$$

A filtering constant Tf [s] used in the filtering block 14 is found from a two-dimensional filtering constant map 31 which depends on the absolute value |Ss| of the driver set speed input state variable Ss and the absolute value |Vd| of the vehicle speed deviation Vd. Here, a first-order low pass filter is used for the filtering block 14, so that a particular time constant Tf is assigned to each grid point in the map as shown in FIG. 7. An intermediate value between two grid points is calculated through linear interpolation, whereas a value out of the map is limited to data of map end.

Figure 9:
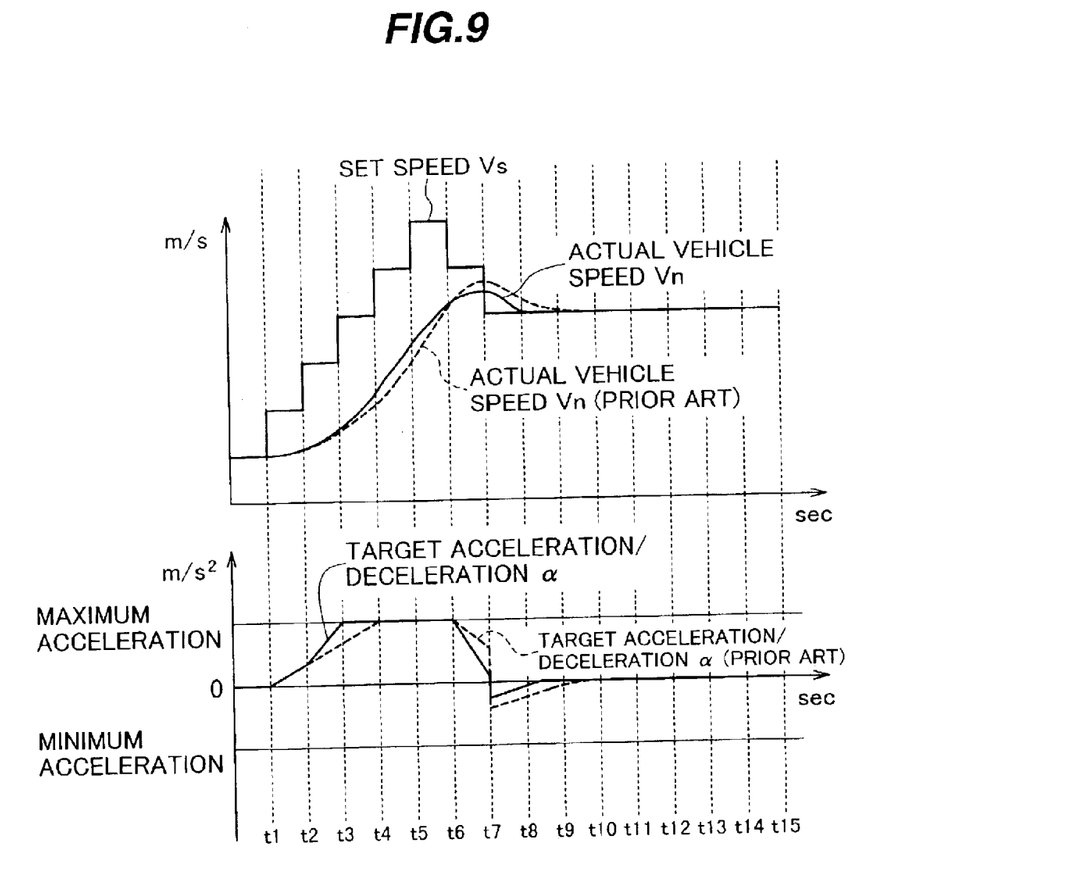
FIG. 9 is a timing chart showing a set speed, an actual vehicle speed and a target acceleration/deceleration during a vehicle cruise control according to the present invention.

As described above, the vehicle cruise control apparatus in the second embodiment determines that the driver wishes a sudden acceleration when the driver continuously pushes the acceleration switch 12 to increase the set speed Vs, and responsively generates a large target acceleration/deceleration, as shown in FIG. 9 so that the vehicle can reach the maximum acceleration in a shorter time (between timings t1 and t3 in FIG. 8) than the prior art technique (between t1 and t4). Specifically, the vehicle cruise control apparatus can determine that the driver wishes a slow acceleration when the driver is continually pushing the acceleration switch 12 at long intervals, and on the contrary, can determine that the driver wishes a sudden acceleration when the driver is continually pushing the acceleration switch 12 at short intervals. In this way, when the operating switch is operated at a high frequency (i.e., when the driver continuously changes the set speed), the absolute value of the target acceleration/deceleration is increased so that the response of vehicle behavior becomes quicker to a change in the set speed. On the other hand, when the operating switch is operated at a low frequency (i.e., when the driver changes the set speed at one time), the behavior of the vehicle can be controlled to gradually match the vehicle speed with a change in the set speed by reducing the absolute value of the target acceleration/deceleration (gradually increasing the target acceleration/deceleration in a negative range).

Between timings t6 and t7 in FIG. 9 in which the vehicle speed deviation Vd begins decreasing, the vehicle speed deviation Vd still has a positive value (the set speed is higher than the actual vehicle speed), so that the target acceleration/deceleration also has a positive value. However, at the time the deceleration switch 13 is pushed (at timing t6 in FIG. 9), the driver set speed input state variable Ss has a large negative value, so that the target acceleration deceleration can be reduced to a smaller value, thereby resulting in a prompt transition from acceleration to deceleration. Specifically, assuming that the deceleration switch 13 is pushed when the driver can request a sudden acceleration, it can be determined that the driver requests a sudden deceleration from a request for a sudden acceleration, with a higher probability than when the driver, who has not operated any switch, operates the deceleration switch 13. This situation can be distinguished from a situation in which the driver, who has not operated any switch, operates the deceleration switch. Thus, as described above, the target acceleration/deceleration can be set to a smaller value in response to a request for a sudden deceleration which is made after a request for a sudden acceleration, thereby making it possible to make a prompt transition from acceleration to deceleration. Consequently, the vehicle cruise control apparatus according to the present invention can prevent an unintended acceleration which could result even in case the driver pushed the deceleration switch, as experienced in the prior art. For example, the vehicle can be controlled to promptly decelerate, as indicated by a solid line in FIG. 9, when the driver operates the deceleration switch twice, while the vehicle is actually running at 80 Km/h, to change the set speed from 110 km/h to 100 km/h.

As described above, the vehicle cruise control apparatus according to the present invention can reduce a deceleration, even when the vehicle speed deviation has a negative value (the set speed is lower than the actual vehicle speed), to transition the control in the accelerating direction at an earlier time upon detection of a high frequency at which the driver operates the acceleration switch. Similarly, the vehicle cruise control apparatus can reduce an acceleration, even when the vehicle speed deviation has a positive value (the set speed is higher than the actual vehicle speed), to transition the control in the decelerating direction at an earlier time upon detection of a high frequency at which the driver operates the deceleration switch.

According to the present invention, since the target acceleration/deceleration can be varied based on how the driver operates the operating switch, the vehicle cruise control apparatus can accomplish the vehicle cruise control which can reflect the driver's will and improve the running feeling.

The vehicle cruise control apparatus according to the present invention can improve a sluggish acceleration, a delayed deceleration and the like, which run counter to the driver's will, as experienced with the prior art illustrated in FIG. 8, to accomplish the vehicle cruise control which follows the driver's will.

What is claimed is:

1. A vehicle cruise control apparatus for controlling a vehicle to run at a set speed desired by a driver, said apparatus comprising:

actual vehicle speed detecting means for detecting an actual speed of the vehicle;

setting means for allowing the driver to operate a desired set speed;

set speed storage means for storing the set speed;

driver set speed input state detecting means for detecting a state in which the driver inputs the set speed using said setting means;

target acceleration/deceleration calculating means for calculating a target acceleration/deceleration based on the driver set speed input state and a vehicle speed deviation when the target acceleration/deceleration is calculated to match the actual vehicle speed with the set speed; and means for controlling a throttle actuator based on the target acceleration/deceleration to increase or decrease the engine power;

wherein said target acceleration/deceleration calculating means calculates a large absolute target value for the target acceleration/deceleration so that the actual vehicle speed promptly follows the set speed, when said driver set speed input state detecting means determines, based on a detected driver set speed input state, that the driver changes the set speed at a high frequency; and wherein said target acceleration/deceleration calculating means calculates a small absolute target value for the target acceleration/deceleration, so that the actual vehicle speed slowly follows the set speed, when said driver set speed input state detecting means determines that the driver changes the set speed at a low frequency.

2. A vehicle cruise control apparatus according to claim 1, wherein:

said target acceleration/deceleration calculating means gradually reduces the target acceleration/deceleration within a positive range even when the vehicle speed deviation takes a positive value to promptly transition from an accelerating state to a decelerating state, when said driver set speed input state detecting means determines based on the driver set speed input state that the driver inputs a sudden deceleration instruction; and said target acceleration/deceleration calculating means gradually reduces the absolute value of the target acceleration/deceleration within a negative range even when the vehicle speed deviation takes a negative value to promptly transition from a decelerating state to an accelerating state, when said driver set speed input state detecting means determines based on the driver set speed input state that the driver inputs a sudden acceleration instruction.

3. A vehicle cruise control apparatus according to claim 1, wherein a switch input frequency variable is generated based on a switch input variable, which is either ON or OFF, and then processed by:

deriving a switch input frequency when the switch input variable either is OFF or has changed from OFF to ON;

substituting the switch input frequency into the switch input frequency variable when the switch input variable is OFF and the switch input frequency is smaller than the switch input frequency variable or when the switch input variable has changed from OFF to ON;

incrementing an OFF-to-ON duration variable when the switch input variable is OFF; and clearing the OFF-to-ON duration variable when the switch input variable is ON.

* * * * *